United States Patent [19]

Furman et al.

[11] Patent Number: 4,949,329

[45] Date of Patent: Aug. 14, 1990

[54] METHOD OF EFFECTING ERASURE OF OPTICAL INFORMATION MEDIA INCLUDING VARYING DUTY CYCLE, LASER POWER AND FOCUS OFFSET

[75] Inventors: Steven R. Furman, Union; James E. Kuder, Fanwood, both of N.J.

[73] Assignee: Hoechst Celanese Corp., Somerville, N.J.

[21] Appl. No.: 300,861

[22] Filed: Apr. 27, 1988

Related U.S. Application Data

[63] Continuation-in-part of Ser. No. 736,340, May 21, 1985, abandoned.

[51] Int. Cl.$^5$ .............................................. G11B 7/013
[52] U.S. Cl. .................................... 369/116; 369/100; 369/121; 369/275.1
[58] Field of Search ................... 369/54, 58, 100, 101, 369/110, 111, 116, 119, 121, 275; 358/342; 346/76 L; 365/119

[56] References Cited

U.S. PATENT DOCUMENTS

| | | | |
|---|---|---|---|
| 3,475,760 | 10/1969 | Carlson | 346/76 L X |
| 3,778,785 | 12/1973 | Gutfeld | |
| 4,264,986 | 4/1981 | Willis | 369/110 X |
| 4,358,774 | 11/1982 | Wilkinson | 346/76 L X |
| 4,371,954 | 2/1983 | Cornet | 369/100 X |
| 4,403,318 | 9/1983 | Nagashima et al. | 369/121 X |
| 4,425,570 | 1/1984 | Bell et al. | 346/76 L X |
| 4,456,914 | 6/1984 | Winslow | 346/76 L |
| 4,478,782 | 10/1984 | Kuder et al. | 369/275 X |
| 4,527,173 | 7/1985 | Gupta et al. | 369/100 X |
| 4,564,931 | 1/1986 | O'Hara et al. | 369/111 X |
| 4,566,088 | 1/1986 | Yoshida et al. | 369/111 X |
| 4,598,395 | 7/1986 | Smith | 365/119 X |
| 4,599,718 | 7/1986 | Nakagawa et al. | 369/275 X |
| 4,710,911 | 12/1987 | Yamada et al. | 369/100 |
| 4,712,207 | 12/1987 | Reno | 369/100 X |

FOREIGN PATENT DOCUMENTS

0136574 4/1985 European Pat. Off.
60-29949 2/1985 Japan.

OTHER PUBLICATIONS

Japanese Journal of Applied Physics, vol. 22, No. 2, Feb., 1983, pp. 340-343.

Primary Examiner—Vincent P. Canney
Assistant Examiner—W. R. Young
Attorney, Agent, or Firm—Burns, Doane, Swecker & Mathis

[57] ABSTRACT

Provided is a process for the erasure of information recorded in an optical information medium. The erasure is effected by irradiating the medium with a laser beam, with the duty cycle, laser power and focus offset having been adjusted from that used during writing such that upon the irradiation complete and clean erasure of the information is effected. It is preferred that the focus offset and laser power are adjusted the minimal amount possible and that the duty cycle is the parameter of the three for which the greatest adjustment is made. Control and adjustment of the three parameters in accordance with the present invention permits one to realize more accurate, efficient and clean erasure, even bit-by-bit erasure if desired, than has heretofore been possible.

14 Claims, 3 Drawing Sheets

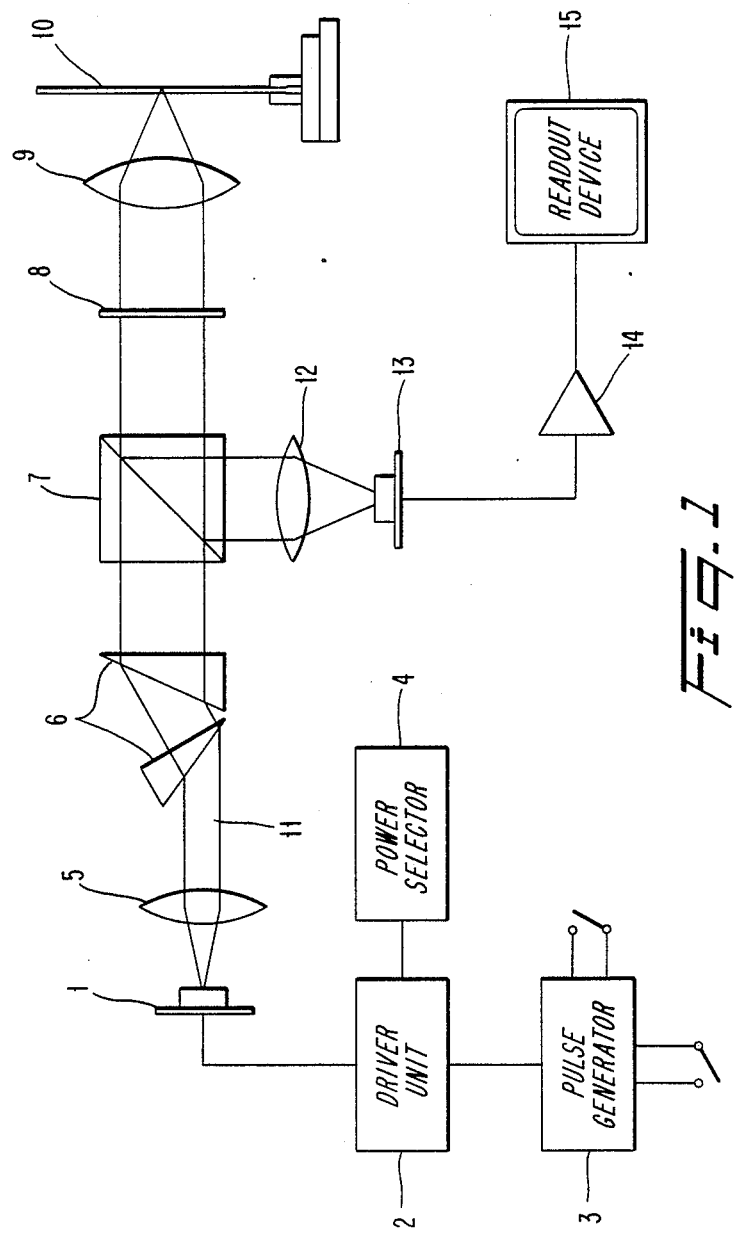

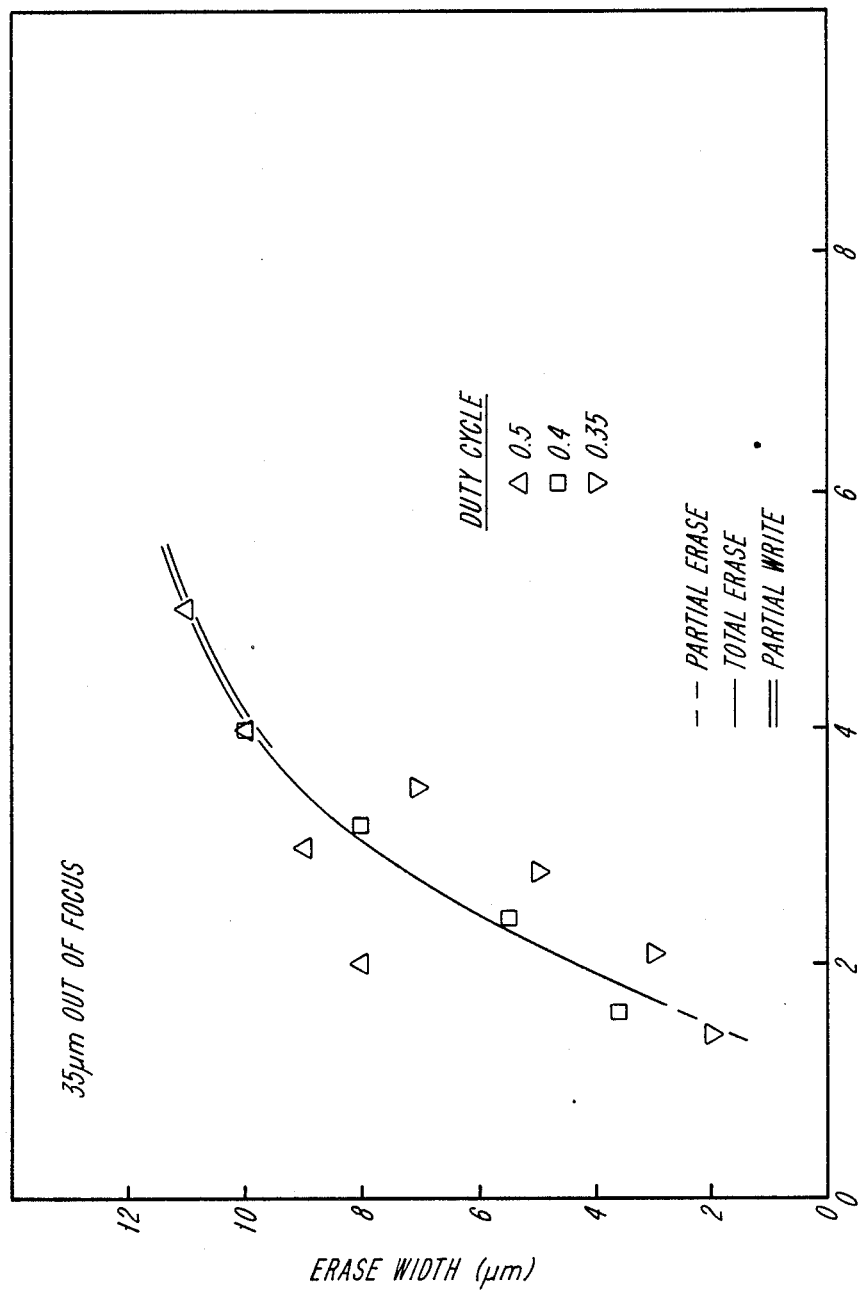

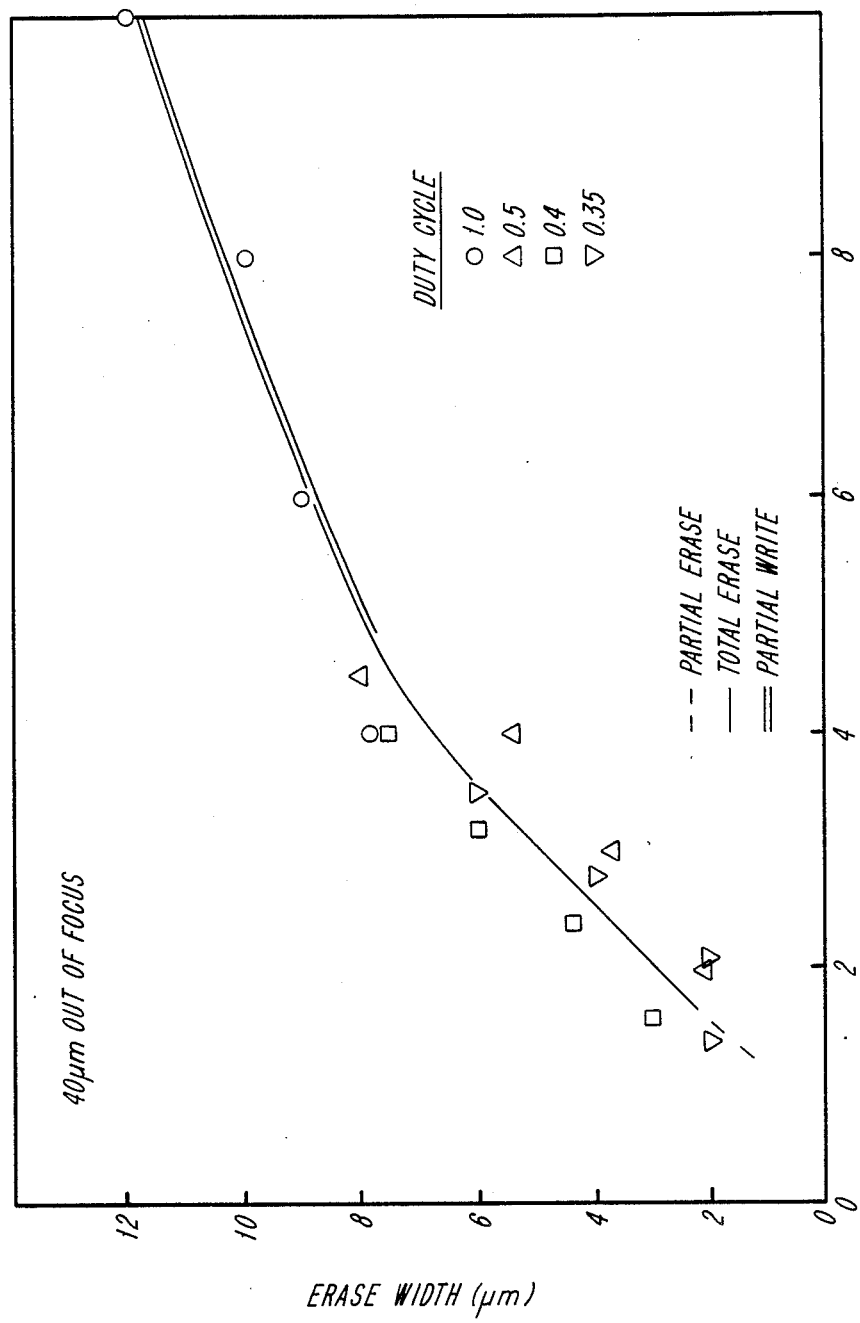

METHOD OF EFFECTING ERASURE OF OPTICAL INFORMATION MEDIA INCLUDING VARYING DUTY CYCLE, LASER POWER AND FOCUS OFFSET

REFERENCE TO RELATED APPLICATIONS

This is a continuation-in-part application of U.S. Ser. No. 736,340, filed May 21, 1985, now abandoned.

BACKGROUND OF THE INVENTION

1. Field of the Invention

The present invention relates to a process for the erasure of information recorded in an optical information medium. More specifically, the present process pertains to an erasure procedure which invokes the adjustment of certain defined parameters in order to effect accurate, efficient and clean erasure of the information desired to be erased.

2. Description of the Prior Art

The accurate and efficient erasure of information patterns in an optical information medium has long been a problem. Various techniques of irradiating and/or heating an optical information medium in order to effect erasure have been attempted.

Techniques for erasing film deformation patterns are particularly widespread. Generally, such techniques have involved heating the film, generally a thermoplastic, sufficiently above its melting point so as to cause surface tension to smooth out the thermoplastic surface. The heating can be global or localized, e.g., by use of a laser beam. When a laser beam is used for the erasure procedure, various alterations in a parameter such as the laser power or focus offset have been made in order to effect the erasure.

U.S. Pat. No. 4,264,986 discloses a method for recording and erasing information in an optical information medium. In the process, a pulsed laser beam is used to inject a pulse of heat energy into a smooth-surfaced recording medium to produce a recording mark left on the surface of the recording medium in the form of a crisply-defined pit or crater. Erasure is achieved by adjusting the intensity of the pulse of laser radiation injected into the recording medium. In the case of a pit or crater, for instance, the depressed area is thereby remelted and raised to a temperature such that a rate of cooling is achieved which results in the remelted volume solidifying to its original state of specific volume, so that the pit is erased and the surface of the medium is restored to its original smooth condition.

In the article "Reversible Read-Write-Erase Properties of Styrene Oligomer Optical Recording Media," *Japanese Journal of Applied Physics*, Vol. 22, No. 2, Feb. 1983, pp. 340–343, there is discussed a total surface heat erasure procedure and a scanning erasure procedure for the erasure of a sequence of pits. In the scanning erasure procedure, the writing objective lens is moved exactly 10 microns out of focus towards the medium, and then the disk surface is irradiated with 10 mW of laser light from a He—Ne laser by moving the light beam in the direction of the pit sequence at a speed of 1 mm/sec.

Another procedure for the erasure of a deformation pattern is described in U.S. Pat. No. 3,475,760, issued to Carlson. The patent discloses a system for recording information as a deformation pattern on a thermoplastic medium by scanning the medium with a high energy small diameter laser beam capable of directly forming a schlieren-readable deformation pattern in the medium without having to provide an electrical charge pattern. Selective erasing of a previously recorded deformation pattern on the medium is provided for by simply recording over the area to be erased using a similar laser beam as used for the previous recording but with a smaller scan line spacing.

U.S. Pat. No. 4,599,718 discloses a method for erasing a light recording medium comprising a thermoplastic resin having a number average molecular weight of 30,000 or less wherein an information pit is refilled by using a light beam diameter greater than the pit diameter.

Suitable apparatus for erasure of information on an optical recording medium is disclosed in U.S. Pat. No. 4,712,207.

Erasure of information patterns other than deformation patterns has also been suggested. For example, note U.S. Pat. No. 4,425,570, issued to Bell et al., which pertains to a reversible recording medium and information record wherein the light absorptive layer is a granular material comprising domains of a light sensitive material embedded in a dielectric matrix. The domains comprise a material which can be reversibly switched from a first state to a second state having different optical properties by the absorption of light. Useful materials include tellurium, selenium or alloys containing these materials, arsenic triselenide, arsenic trisulfide and other chalcogenide alloys where absorbed light produces a change in the degree of crystallinity.

U.S. Pat. No. 4,710,911 discloses a method of erasing optical information from a state-changeable photosensitive recording film which comprises initially irradiating an area on the recording film at a power level sufficient to raise the temperature of the film above its melting point. Erasure is then effected by a slow cooling of the film through a slow reduction in the power of the light irradiating the film.

The problem to date, however, is that the erasure techniques heretofore known have often resulted in noisy, i.e., not clean, or incomplete erasure. As well, erasure is often times accompanied by or the result of gouging or additional writing. This results in a noisy record of information. It would be preferable to return the medium to a clean, unwritten state upon erasure. A process for avoiding these disadvantages, therefore, is most desired in the art. Indeed, a process which can provide accurate, fine-tuned yet complete erasure would greatly enhance the commercial viability of optical information media.

Accordingly, it is an object of the present invention to provide a novel process for the erasure of an informaton pattern recorded in an optical information medium which overcomes the aforementioned problems.

It is another object of the present invention to provide a process for erasing information in an optical information medium wherein, specifically, the information is in the form of pits.

Another object of the present invention is to provide a process for the erasure of information recorded in an optical information medium which effects accurate yet complete erasure of the information.

Still another object of the present invention is to provide a process for the erasure of information recorded in an optical information medium which effects erasure without additional writing on the medium or gouging of the medium.

Yet another object of the present invention is to provide an efficient process for the erasure of information recorded in an optical information medium which effects erasure and leaves a noise-free background.

These and other objects, as well as the scope, nature and utilization of the invention, will be apparent to those skilled in the art from the foregoing description, the drawing and the appended claims.

SUMMARY OF THE INVENTION

In accordance with the foregoing objectives, provided hereby is such a novel process for the erasure of information recorded in an optical information medium which comprises an information layer having a melting point in the range of from about 50° to about 250° C. The process comprises irradiating the medium with a laser beam subsequent to adjusting the duty cycle, laser power and focus offset of the laser from that used during the writing step. The adjustment of the three foregoing parameters is such that complete erasure is effected substantially without additional writing. This is generally achieved for the information layer of the present invention when the three foregoing parameters are adjusted such that the product of (laser power in mW)×(duty cycle)×(power per area at distance of focus offset/power per area of focus offset at 40 microns) is in the range of from about 3 to about 4.

The present process thereby allows one accurate and complete erasure through control of the foregoing parameters, whether bit-by-bit or sector-by-sector, and is particularly applicable for the erasure of information recorded in an optical information medium in the form of pits or some other deformation pattern.

In a preferred embodiment, the adjustments made to the laser power and focus offset are as minimal as possible while the duty cycle is the parameter of the three for which the greatest adjustment is made. This allows for the utilization of less electronic hardware and can result in a faster response time to the erasure mode of the overall system.

BRIEF DESCRIPTION OF THE DRAWING

FIG. 1 is a schematic of a laser system useful in writing, reading and erasing information in an optical information medium.

FIGS. 2 and FIG. 3 are plots of experimental runs, which plots indicate when complete erasure occurs in accordance with the present invention.

DETAILED DESCRIPTION OF THE PREFERRED EMBODIMENTS

The present process is applicable to any optical information medium having an information layer with a melting point in the range of from about 50° to about 250° C., with the information layer having an information pattern thereon. Such media are well known and can comprise a polymer, polymer/dye combination, dye or chromophoric material. Preferred polymers of which the medium can be comprised include, but are not limited to, the dimer acid polyamides, e.g., as disclosed in U.S. Pat. No. 4,478,782.

The medium can be formed using conventional technology as is well known to the skilled artisan. For example, conventional coating techniques such as spin coating can be used. The information pattern ca also have been recorded in the medium using any of the well-known techniques or systems replete in the art. The information pattern is preferably of a deformation pattern such as one comprised of pits. The only requirement is that thermal erasure is possible upon irradiation. The present process is most applicable to information patterns comprised of pits or some other deformation.

The erasure process of the present invention comprises adjusting three defined parameters of the laser system and then simply irradiating those portions of the medium containing the information to be erased with a laser beam. The irradiation can be such as to effect erasure of a single bit of information at a time, i.e., bit-by-bit erasure wherein the erase beam addresses the medium until the desired bit of information is erased. Or, the irradiation can be sector-by-sector wherein the medium is addressed by the erase beam until the sector of information to be erased has been erased. Such finetuned and accurate erasure has been found consistently possible through the practice of the present invention wherein the three defined parameters of duty cycle, laser power, and focus offset are controlled and adjusted appropriately from that used duing writing.

The duty cycle is defined as that fraction of time the laser is on in any one on/off cycle. For the purposes of the present invention, it is important that at least two on/off cycles, and preferably more than two cycles, e.g., generally at least 500 cycles, are realized in erasing any one bit of information. In other words, the period of the on/off cycles is less than the time required for the beam to scan a single bit of information.

Another manner in which the duty cycle can be defined for purposes of the present invention is pulse width/pulse repetition time. The pulse width is the time the laser is on whereas the pulse repetition time is the time the laser is on plus the time between the laser being turned off and being turned on again. Thus, the pulse repetition time defines the length of the cycle. The duty cycle is therefore that fraction of the cycle for which the laser is on. If the pulse width, i.e., the time the laser is on for a continuous time period, is 1 time unit, and the pulse repetition time is 2 time units, the duty cycle will be 0.5 (½) or 50%. A 100% duty cycle, or duty cycle of 1, is realized when the laser is on continuously.

The laser power parameter is defined as the amount of energy being delivered to the surface of the media in mW.

The focus offset is the distance from the optimal focus point, which is that point in which the beam is in focus on the medium surface. In general, the farther one strays from the optimal focus point, the more diffuse the energy at the medium plane. In making the adjustments of the present invention, the focus offset is considered in terms of the power of the laser at the medium plane as defined by the following term:

$$\frac{\text{(power per area at focus offset distance)}}{\text{(power per area at a focus offset distance of 40 microns)}}$$

If the focus offset is less than 40 microns, the value of the foregoing term generally becomes greater than one, whereas the value becomes less than one as the focus offset becomes greater than 40 microns.

In accordance with the present invention, the three foregoing parameters are adjusted in order that complete erasure of the desired information occurs without additional writing on the information medium of the present invention. The three parameters are preferably monitored or adjusted such that the following relationship is realized:

$$\frac{\text{(laser power in mW)} \times \text{(duty cycle)} \times \text{(power per area at focus offset distance)}}{\text{(power per area at focus offset distance of 40 microns)}} =$$

$$P_{eff} = \text{from about 3 to about 4.}$$

By adjusting the laser power, duty cycle and focus offset in accordance with the aforedefined relationship, it has been found that complete erasure for information media having a melting point in the range of from about 50° to about 250° C. is realized in almost all instances. While there may be instances where a small additional adjustment in one of the parameters, e.g., the duty cycle, is necessary in order to achieve complete erasure, generally complete erasure is observed when the defined relationship is between 3 and 4. Many times complete erasure can also be observed when the value of the relationship is less than 3 or greater than 4. However, when the relationship is controlled to have a value of between 3 and 4, further adjustment of the parameters should not be generally necessary. Therefore, by recognizing the foregoing relationship between the parameters and adjusting the value to a range of from about 3 to about 4, the objectives of complete and clean erasure can be readily achieved.

The erasure process of the present invention and its surprising advantages are therefore derived at least in part from the recognition of the importance of the three aforedefined parameters and their interrelationship in achieving a clean, efficient and complete erasure. The adjustment of all three parameters in accordance with the present invention provides one with an erasure process which is more accurate, complete and finely tuned than has heretofore been possible or known to the prior art.

By the present process, wherein all three defined parameters are adjusted prior to addressing the medium with the erase beam, the possibility of writing while erasing and incomplete erasure are essentially eliminated. Yet, fine control over the degree of erasure is realized, as erasure of a single bit of information is possible. Also, one can readily adjust the width of erasure, even to the width of the information bit. This is all possible because of the recognition of the importance of the duty cycle in conjunction with the focus offset and laser power parameters. Indeed, by adjusting the duty cycle primarily, little adjustment of the focus offset is necessary, thereby requiring little movement of the optics. As well, little adjustment of the laser power is thereby required. The present process permits one a more finely tuned, accurate and complete erasure.

The present invention is further illustrated by the following example, the details of which are in no way meant to be limitative, but rather merely illustrative.

EXAMPLE

The following example demonstrates the ability of achieving clean and complete erasure of an information pattern of pits recorded in an optical information medium upon properly adjusting the three parameters of duty cycle, laser power and focus offset in accordance with the present invention. As well, the examples show the importance of the combination of parameters, as incomplete erasure or writing occurs when the parameters are not carefully controlled. By following the procedure of the example, one will also be able to determine the appropriate parameters for any given medium and scan speed.

In the example, the optical medium comprised a dye/polymer film coated on a glass substrate. The dye/polymer combination had been spin coated onto the glass substrate from dichloroethane. The thickness was 0.17 microns.

The dye/polymer information layer, specifically, was comprised of a dimer acid polyamide, an Eastman cyanine dye available under the designation IR-312, and a nickel coordination complex dye available from Mitsui Toatsu Co. under the designation PA-1006. The weight ratio of cyanine dye to nickel complex dye was 2:1, and the weight ratio of polymer to total dye content was 7.6:1. The melting point was about 50° C.

The erasing was accomplished using the laser set-up depicted schematically in FIG. 1. In the Figure of the Drawing, electrical power is fed to the diode laser 1 from a driver unit 2. The driver is itself addressed by two other components (i) the pulse generator 3 which controls the pulse width of the laser output and (ii) the power selector 4 which controls the power of each laser pulse. The laser output was 830 nm.

The beam 11 emerging from the diode junction is oval and diverging. The collimator lens 5 converts the diverging beam into one whose rays are parallel. The prism pair 6 converts the oval beam into one with circular cross section.

The collimated circular beam passes through a polarizing beam splitter (PBS) 7 and quarter wave plate 8 and is focused by a lens 9 onto the sample 10. The combination of PBS and quarter wave plate serves to separate the incident and reflected beams. This is accomplished by controlling the polarization of light with respect to the hypotenuse interface of the two right angle prisms which are cemented together to form the PBS.

In the optical train of the tester, light enters the PBS with p-polarization and emerges from the quarter wave plate with circular polarization and is then focused onto the sample. Light reflected from the sample is still circularly polarized and after passing through the quarter wave plate is converted to linearly polarized light with s-polarization. It is now reflected to the side by the PBS and then focused through a detector lens 12 onto a photodiode 13.

The photodiode produces a voltage proportional to the light intensity impinging on it. The photovoltage may be amplified 14 and then fed into an oscilloscope 15 or other suitable readout device.

While the foregoing set-up is one example of a set-up useful for writing and reading optical information, as described above, in the present experimental run, the aforenoted set-up was used simply for irradiation in order to erase the recorded pit pattern of information. Reading of information did not take place.

The scan speed employed was 280 microns/second. The laser power, duty cycle and distance out of focus (focus offset) were all noted and recorded, and are tabulated in the following Table. The number of on/off cycles of the laser per bit of information was about 1780, when the duty cycle was less than unity. Also in the Table is the erasure width for each run, which was measured by using a Leitz Orthoplan Pol optical microscope.

TABLE

| LASER POWER (mW) | DUTY CYCLE | ERASURE WIDTH (microns) | FOCUS OFFSET (microns) | $P_{eff}$ (mw) | EFFECT* |
|---|---|---|---|---|---|
| 10 | 100% | 12 | 40 | 10 | W |
| 8 | 100% | 10 | 40 | 8 | W |
| 6 | 100% | 9 | 40 | 6 | W |
| 4 | 100% | 7.8 | 40 | 4 | W |
| 10 | 50% | 8 | 40 | 5 | E |
| 8 | 50% | 5.4 | 40 | 4 | E |
| 6 | 50% | 3.7 | 40 | 3 | E |
| 4 | 50% | 2.1 | 40 | 2 | E |
| 10 | 40% | 7.5 | 40 | 4 | E |
| 8 | 40% | 6 | 40 | 3.2 | E |
| 6 | 40% | 4.2 | 40 | 2.4 | E |
| 4 | 40% | 3 | 40 | 1.6 | E |
| 10 | 35% | 6 | 40 | 3.5 | E |
| 8 | 35% | 4 | 40 | 2.8 | E |
| 6 | 35% | 2 | 40 | 2.1 | E |
| 4 | 35% | 2 | 40 | 1.4 | PE |
| 10 | 50% | 11 | 35 | 6.5 | W |
| 8 | 50% | 10 | 35 | 5.2 | E |
| 6 | 50% | 9 | 35 | 3.9 | E |
| 4 | 50% | 8 | 35 | 2.1 | E |
| 10 | 40% | 10 | 35 | 5.2 | W |
| 8 | 40 | 8 | 35 | 4.2 | E |
| 6 | 40% | 5.5 | 35 | 3.1 | E |
| 4 | 40% | 3.8 | 35 | 2.1 | E |
| 10 | 35% | 7 | 35 | 4.6 | E |
| 8 | 35% | 5 | 35 | 3.6 | E |
| 6 | 35% | 3 | 35 | 2.7 | PE |
| 4 | 35% | 3 | 35 | 1.8 | PE |
| 10 | 50% | 9 | 30 | 8.8 | W |
| 8 | 50% | 6.9 | 30 | 7.0 | W |
| 6 | 50% | 6.0 | 30 | 5.3 | E |
| 4 | 50% | 5.2 | 30 | 3.5 | E |

*E = Complete Erasure
W = Write
PE = Partial Erasure

The foregoing data are also graphically displayed in FIGS. 2 and 3. Therein, the graphs have been separated according to focus offset, with the graphs reflecting erasure width vs. (laser power × duty cycle).

From the graphs, the importance of the three parameters can be clearly seen. If the three are not properly controlled, either partial erasure or writing occurs with erasure. Upon appropriately adjusting the parameters in accordance with the present invention, however, complete finetuned erasure is achieved without writing. This is particularly true when the value of $P_{eff}$ is controlled to be in the range of from about 3 to about 4.

The data in the foregoing Table also demonstrates the ability to control the erasure width upon simply adjusting the duty cycle, and keeping the other parameters constant. This is important as it is most desirable to have the erasure width as close to the information bit width as possible.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for the erasure of information recorded in an optical information medium by irradiating the medium with a laser beam, said optical information medium having an information layer with a melting point in the range of from about 50° C. to about 250° C., the improvement which comprises adjusting the
   (i) duty cycle;
   (ii) laser power; and
   (iii) focus offset of the laser from that used during writing such that the product of $$(\text{laser power in mW}) \times (\text{duty cycle}) \times \frac{(\text{power per area at focus offset distance})}{(\text{power per area at focus offset distance of 40 microns})}$$

ranges from about 3 to about 4, the adjustments being such that complete erasure of the information desired to be erased is effected substantially without additional writing.

2. The process for erasure of claim 1, wherein the information recorded in the information layer of the optical information medium is in the form of pits, and the erasure effected is a levelling of the pits.

3. The process for erasure of claim 1, wherein the duty cycle is the parameter which is adjusted first.

4. The process for erasure of claim 1, wherein the information layer of the medium comprises a dimer acid polyamide.

5. The process for erasure of claim 4, wherein the information layer of the medium further comprises a dye or chromophoric material.

6. The process for erasure of claim 1, wherein the information layer of the medium comprises a polymeric material.

7. The process for erasure of claim 6, wherein the information layer of the medium further comprises a dye or chromophoric material.

8. The process for erasure of claim 1, wherein the information layer of the medium comprises a dye or chromophoric material.

9. The process for erasure of claim 6, wherein the information layer of the medium comprises a dimer acid polyamide.

10. The process for erasure of claim 1, wherein bit by bit erasure is effected.

11. The process for erasure of claim 1, wherein the width of erasure is substantially the same as the width of the bits of information to be erased.

12. The process for erasure of claim 1, wherein the laser beam is emitted from a AlGaAs diode laser.

13. The process for erasure of claim 1, wherein sector-by-sector erasure is effected.

14. The process for erasure of claim 10, wherein a single bit of information is erased.

* * * * *